Figure 6:
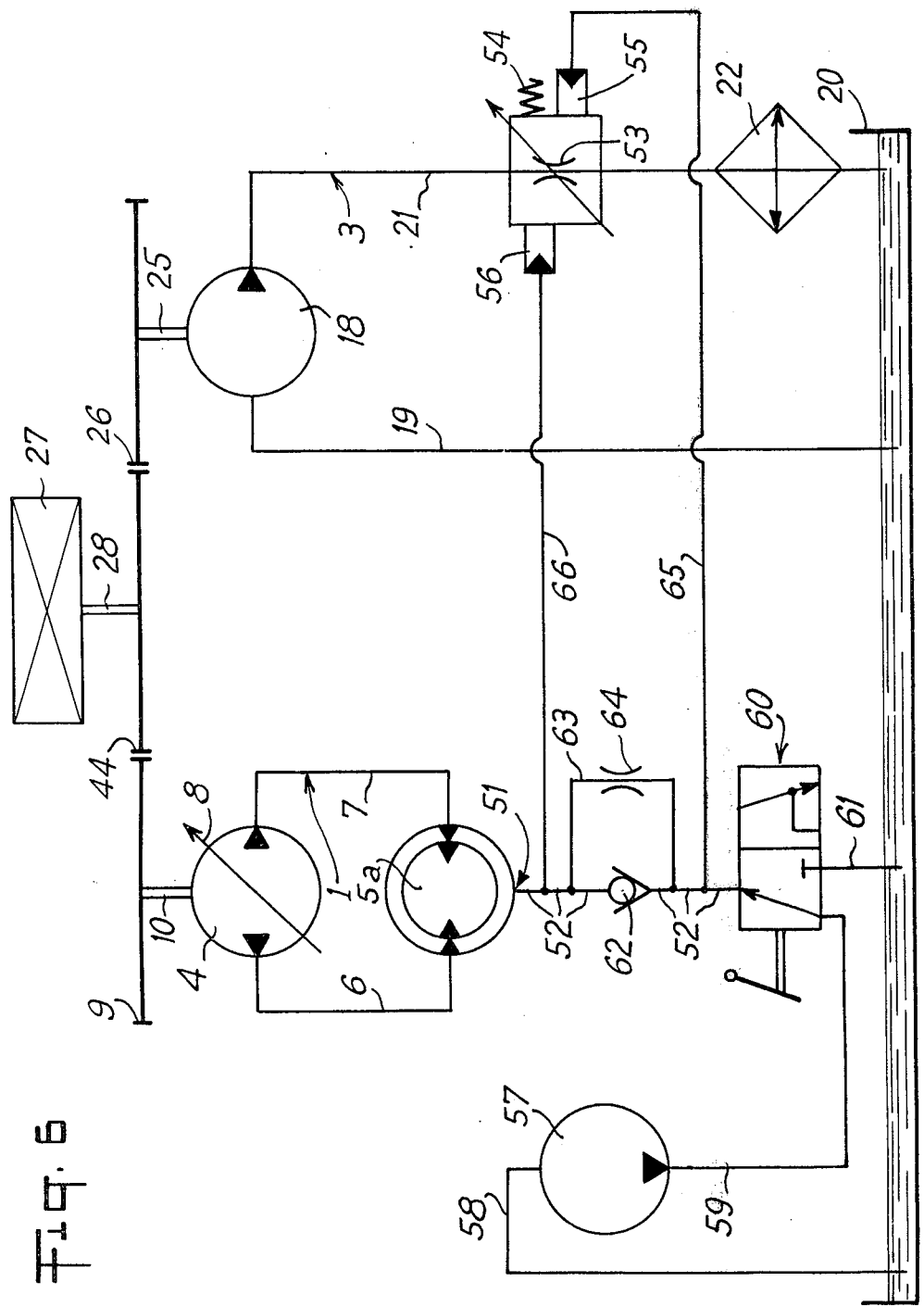

United States Patent [19]

Martin

[11] 3,932,992

[45] Jan. 20, 1976

[54] PRESSURIZED FLUID SUPPLY POWER CONTROL MEANS

[75] Inventor: Louis E. Martin, Senlis, France

[73] Assignee: Poclain, Le Plessis Belleville, France

[22] Filed: Nov. 11, 1974

[21] Appl. No.: 522,841

[30] Foreign Application Priority Data

Nov. 21, 1973 France .............................. 73.41493

[52] U.S. Cl. ...................... 60/431; 60/456; 60/466; 60/486

[51] Int. Cl.² .......................................... F15B 18/00

[58] Field of Search ............. 60/427, 428, 431, 456, 60/459, 461, 466, 468, 484, 486

[56] References Cited
UNITED STATES PATENTS

| | | | |
|---|---|---|---|
| 1,698,189 | 1/1929 | Dunbar............................ | 60/486 X |
| 3,224,196 | 12/1965 | Bennett............................ | 60/427 X |
| 3,753,351 | 8/1973 | Pause et al........................ | 60/486 X |

*Primary Examiner*—Edgar W. Geoghegan
*Attorney, Agent, or Firm*—Mason, Fenwick & Lawrence

[57] ABSTRACT

A pressurized fluid supply apparatus comprises a closed circuit including a variable delivery pump, an open circuit including a pump, a fluid reservoir and a fluid cooler, and an engine for driving said pumps having an output shaft coupled to the drive shafts of said pumps, a flow-limiter being provided in the delivery conduit of said pump of said open circuit and including a restriction whose configuration is independent of the pressure of fluid in said delivery conduit upstream of said flow-limiter.

8 Claims, 6 Drawing Figures

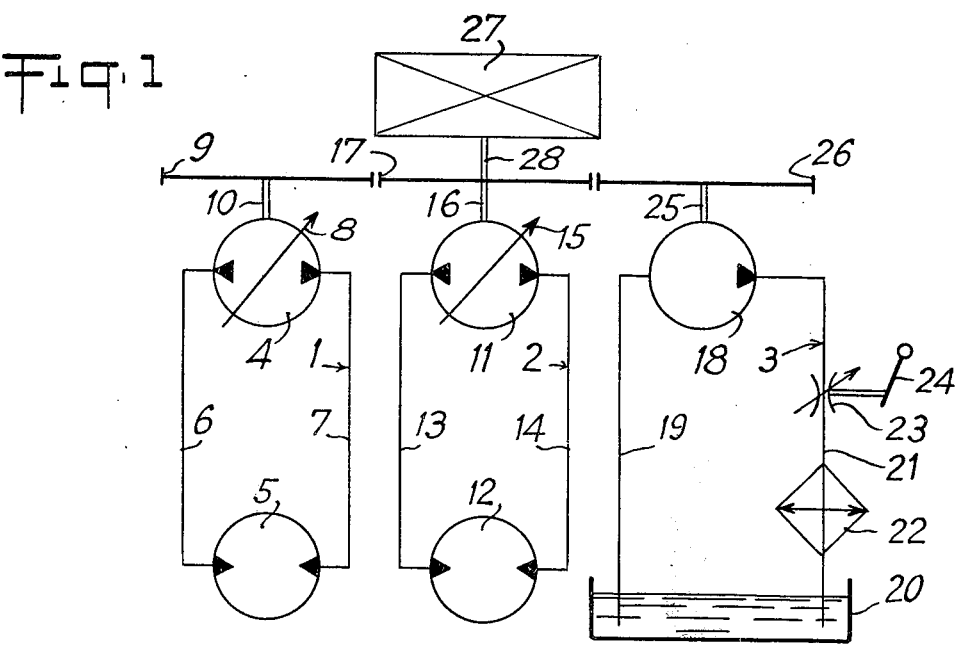
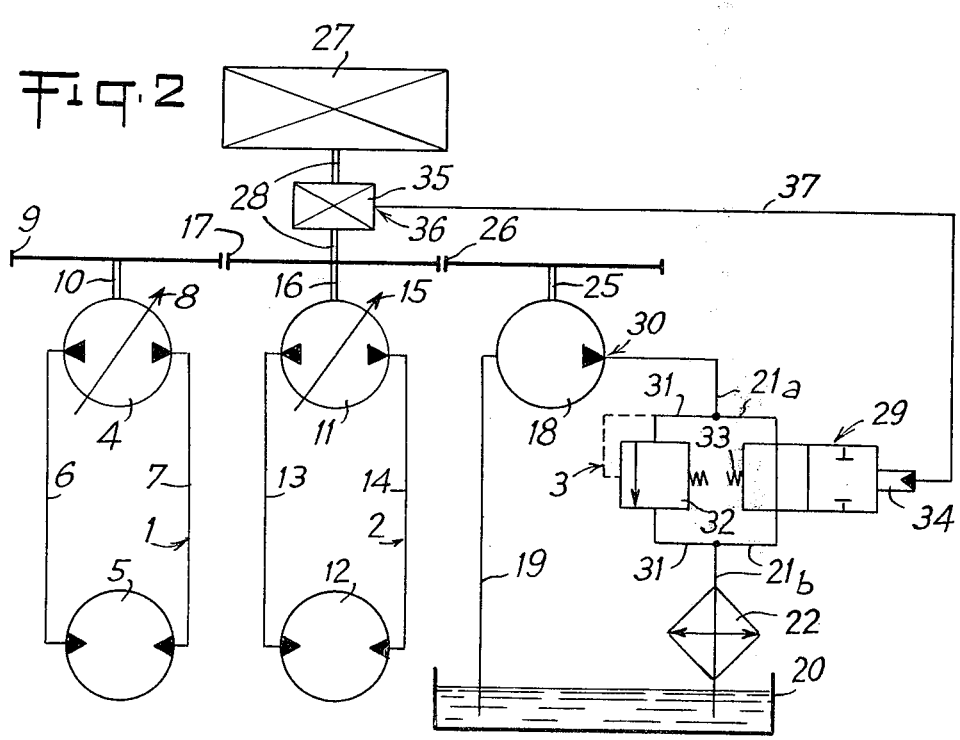

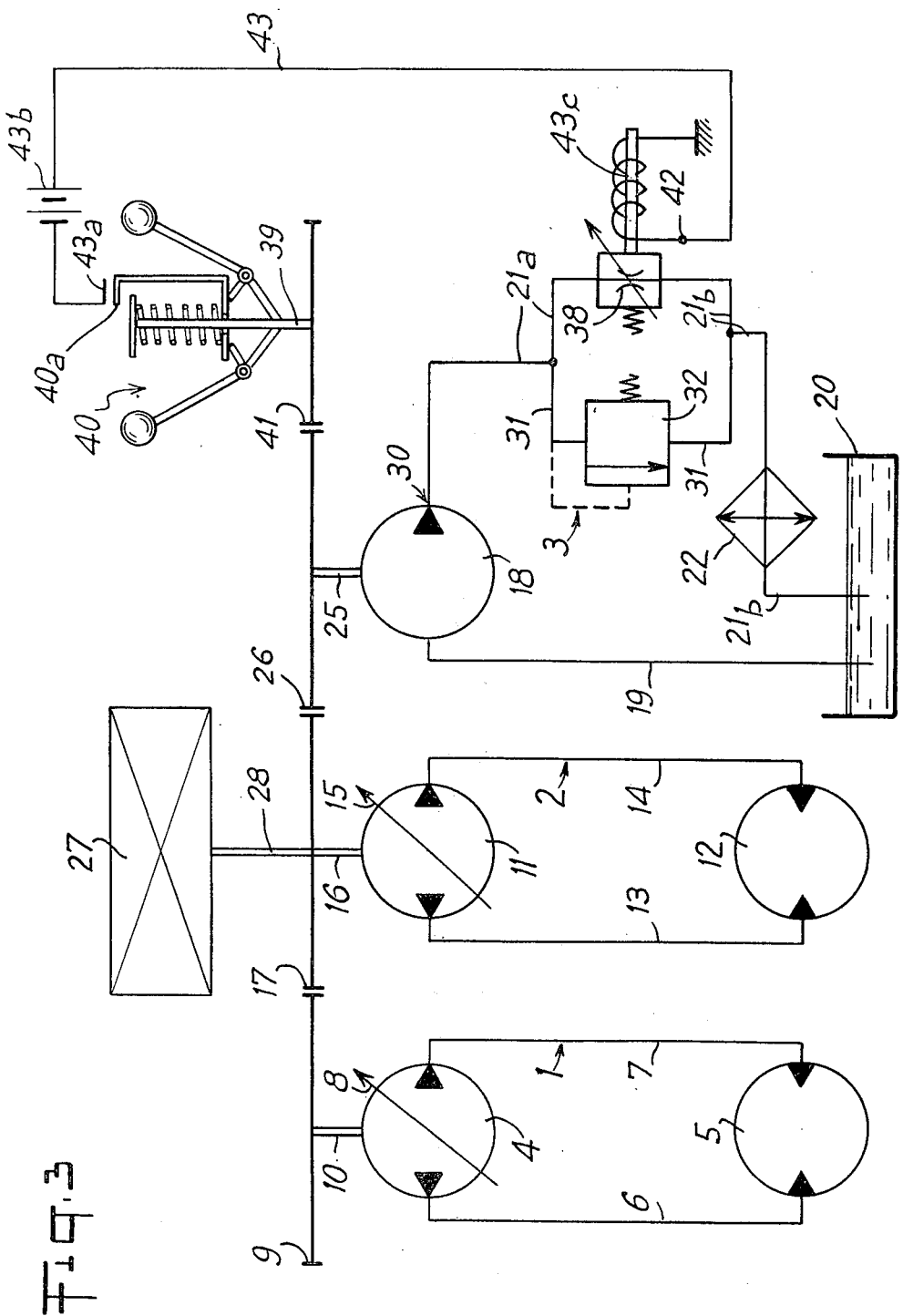

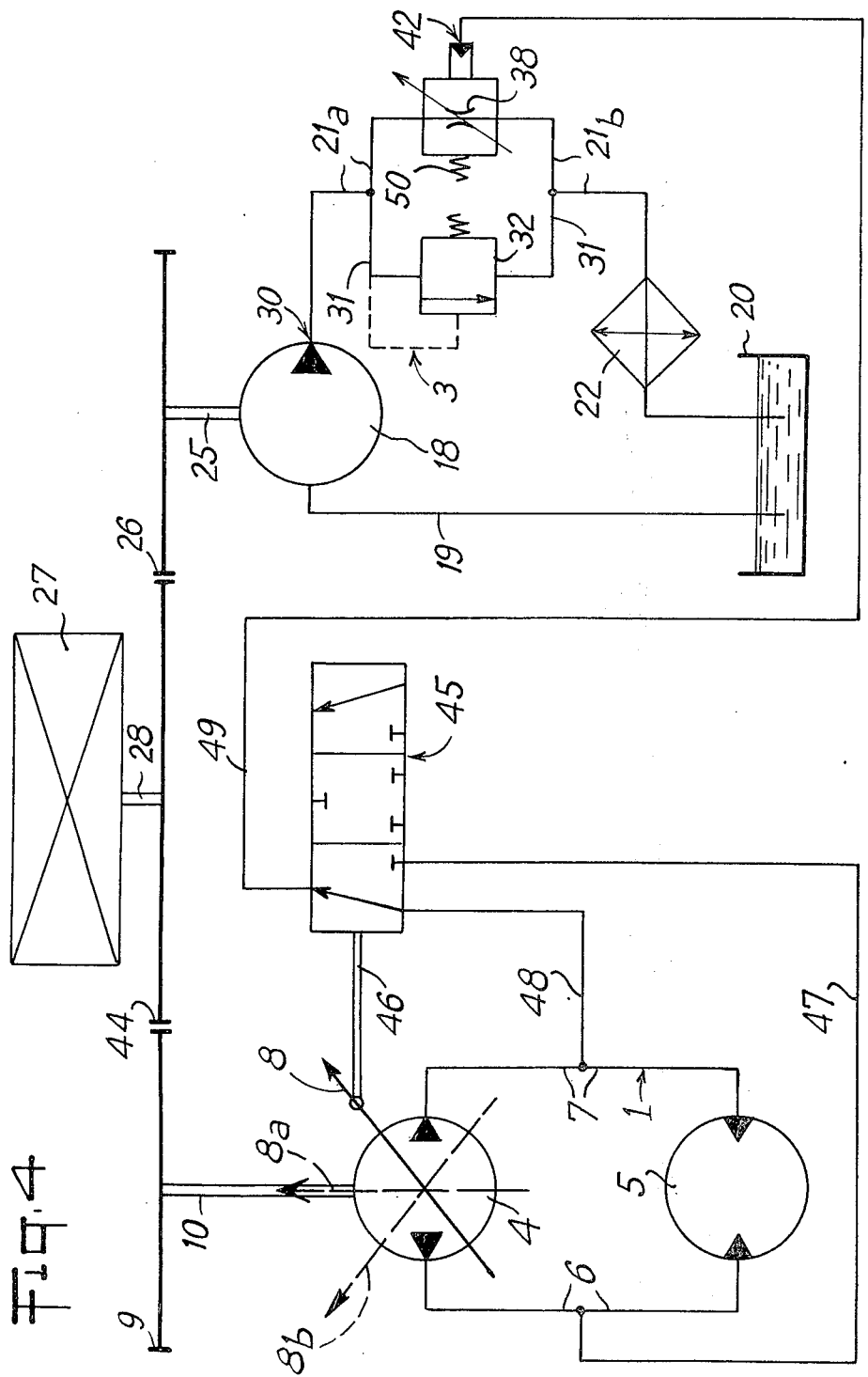

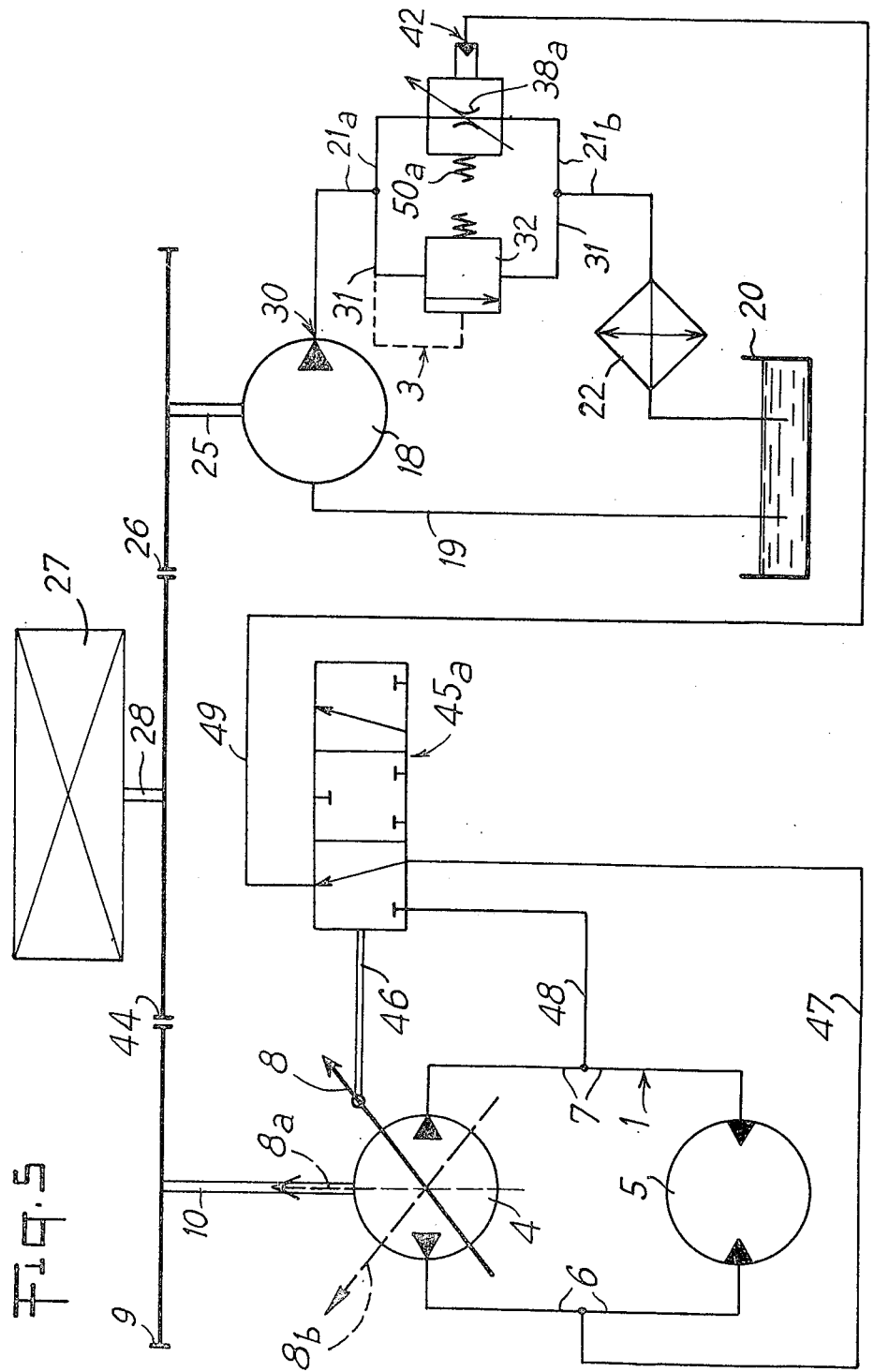

PRESSURIZED FLUID SUPPLY POWER CONTROL MEANS

The present invention relates to improvements in pressurized fluid supply apparatus.

Whether to supply a sink in open circuit, with the pump drawing from a fluid reservoir, or conversely in closed circuit, with a variable delivery pump which can deliver pressurized fluid into one of its main conduits which connect it to the sink, is a primary decision which must concern any machine manufacturer.

The present tendency seems to favour the adoption of closed circuit supplies. However, there are certain problems which today are well solved in conventional manner for open circuits but for which satisfactory solutions have not been found for closed circuits.

Thus, for example, the open circuit supply of hydraulic motors for driving an hydraulic excavator from pumps driven by an engine of the "Diesel" type includes a flow-limiter arranged in the delivery conduit of the hydraulic motor or motors and operated by the pressure of the fluid contained in the supply conduit to the motor or motors. This arrangement:

ensures that the downhill speed of the excavator is correctly limited,
avoids cavitation in the hydraulic motors,
avoids racing of the "Diesel" engine.

This solution cannot be adopted as it is in closed circuit supplies, for it then has considerable disadvantages. Amongst these it may be noted that:

as oil which passes through a flow-limiter is heated and the quantity of heat released remains within the closed circuit, the temperature of this oil rises until it reaches inadmissible values;

a flow-limiter is required for each supply direction of the sink, which is expensive but which also causes considerable pressure drops when the limiters are not in active operation;

lastly, it is imposssible to recover the power dissipated in a circuit in which the sink operates momentarily as a motor.

It is an object of the invention to correct the above mentioned technical deficiency with regard to closed circuits.

According to the present invention, there is provided a pressurized fluid supply apparatus comprising:

a closed circuit including a variable delivery pump having a drive shaft and no flow-limitation;

an open circuit including a pump, having a drive shaft, a fluid reservoir and a fluid cooler;

an engine for driving said pumps and having an output shaft to which are coupled said drive shafts of said pumps, and a flow-limiter arranged in the delivery conduit of said pump of said open circuit and comprising a restriction whose configuration is independent of the pressure of the fluid in the portion of said delivery conduit immediately upstream of said flow-limiter.

The flow-limiter is advantageously provided with manually or automatically operable control means.

In the case of an automatically operable control flow-limiter one of several embodiments may be adopted, as follows:

the flow-limiter may comprise a two-position distributor which is coupled to return means and to an operating ram supplied with fluid, whose effect on the distributor is opposed to that of the return means, the first position of the distributor corresponding to the placing in communication of the two portions of the delivery conduit connected to the distributor and to the preponderance of the effect of the return means, and the second position of the distributor corresponding to the blocking of the said two portions of the delivery conduit by the distributor. A torque meter is arranged on the output shaft of the engine and an output of the torque operates the ram of the distributor as soon as the value of the torque drops below a predetermined value;

a centrifugal governor may be coupled to the output shaft of the engine and cause the closure of the flow-limiter as soon as an excessive speed of the engine is detected.

Closure of the flow-limiter may alternatively be caused, by the excess pressure of fluid in the intake conduit of the pump of the closed circuit. In this case, a three-position distributor is connected to the two main conduits of variable delivery pump of the closed circuit by two auxiliary conduits and to control means for operating the flow-limiter by an operating conduit. The distributor is coupled to means for controlling delivery of the variable delivery pump. The intermediate position of the distributor corresponds to the blocking of the two auxiliary conduits by the distributor and to the neutral (zero delivery) position of the means for controlling the variable delivery pump, and the two extreme positions of the distributor correspond to the placing in communication of the operating conduit with a respective one of the auxiliary conduits and to a non-neutral position of the control means of the variable delivery pump (non-zero delivery into one or the other of the auxiliary conduits). Closure of the flow-limiter is controlled by excess pressure of fluid in that auxiliary conduit which is in communication with the operating conduit in the corresponding extreme position of the distributor and which, at the moment in question, forms the intake conduit of the variable delivery pump, by a drop in the pressure of fluid contained in the delivery conduit of the pump of the closed circuit. In this case, a three-position distributor is connected to the two main conduits of the variable delivery pump of the closed circuit by two auxiliary conduits and to control means for operating the flow-limiter by an operating conduit. The distributor is coupled to means for controlling delivery of the variable-delivery pump. The intermediate position of the distributor corresponds to the blocking by the distributor of the two auxiliary conduits and to the neutral (zero delivery) position of the control organ of the variable delivery pump, and the two extreme positions of the distributor correspond to the placing in communication of the operating conduit with a respective one of the auxiliary conduits and to a non-neutral position of the control means of the variable delivery pump (non-zero delivery into one or the other of the auxiliary conduits). Closure of the flow-limiter is caused by a drop in the pressure of fluid in that auxiliary conduit which is in communication with the operating conduit in the corresponding extreme position of the distributor and which, at the moment in question, forms the delivery conduit of the variable delivery pump, by the selection of the large cylinder capacity of a motor of the closed circuit, which motor is of the type with at least two cylinder capacities. In general, a motor having two cylinder capacities is used, and the motor also has means for selecting the cylinder capacity, which means is connected to said motor by a selection conduit. A non-return valve arranged in the selection conduit permits passage of fluid towards the motor, a "by-pass" conduit is connected to the selection conduit on either side of the non-return valve, and a restriction is arranged in this by-pass conduit. The flow-limiter is provided with return means and a first operating ram, the effect of each of which tends to keep the flow-limiter open, and with a second operating ram whose effect tends to close the flow-limiter. Finally, the first operating ram is connected by a first operating conduit to the selection conduit downstream of the non-return valve relative to the motor and the second operating ram is connected by a second operating conduit to the selection conduit upstream of the non-return valve relative to the motor.

The invention will be better understood from the following description of embodiments thereof, given by way of example only, with reference to the accompanying drawings, in which:

FIGS. 1 to 4 diagrammatically show four preferred embodiments of the invention.

The embodiment of FIG. 1 has two closed circuits 1 and 2 and an open circuit 3. The closed circuit 1 comprises a variable delivery pump 4 and a reversible hydraulic motor 5 which are connected by means of two main conduits 6 and 7 forming the delivery and intake conduits of the pump 4 and vice versa, depending on the position of the control means 8 of the delivery of the pump 4. A pinion 9 is fast for rotation with the drive shaft 10 of the pump 4.

The closed circuit 2 is similar to the circuit 1 and comprises a variable delivery pump 11, a reversible motor 12, and two main conduits 13 and 14 which connect the motor 12 to the pump 11. The pump 11 has a means 15 for controlling its delivery and a drive shaft 16 with which a pinion 17 is fast for rotation.

Lastly, the open circuit 3 comprises a pump 18, which is connected by its intake conduit 19 to a fluid reservoir 20, and whose delivery conduit 21 is connected, in this embodiment, to the reservoir 20. An oil-cooler 22 and a flow-limiter 23 are arranged in the delivery conduit 21, the flow-limiter 23 being of a type which is manually adjustable by means of the lever 24. The drive shaft 25 of the pump 18 is fast for rotation with a pinion 26.

It will also be noted that a "Diesel" engine 27 has its drive shaft 28 fast for rotation with the pinion 17 which meshes with the pinions 9 and 26.

The supply apparatus of FIG. 2 comprises the majority of the components of the apparatus of FIG. 1 which have been given the same reference numbers. Thus the apparatus includes the two closed circuits 1 and 2, the pump 18 of the open circuit 3, and the "Diesel" engine 27, whose output shaft 28 is coupled to the drive shafts 10, 16 and 25 of the pumps 4, 11 and 18 by means of the pinions 9, 17 and 26.

In this embodiment the delivery conduit of the pump 18 of the open circuit 3 is divided into two parts 21a and 21b which are both connected to a two-position distributor 29 and part 21a is connected to the delivery orifice 30 of the pump 18 and the part 21b is connected to the reservoir 20. A conventional calibrated discharge-valve 32 is arranged in a conduit 31 connected to both parts 21a and 21b. The cooler 22 is arranged in the conduit part 21b.

A return spring 33 is coupled to the distributor 29 and is effective to oppose the force of the pressure of fluid contained in an operating ram 34 which is coupled to the distributor 29. The first position of the distributor 29 corresponds to placing the conduit part 21a and 21b in communication, the second position conversely corresponding to the blockage of the parts 21a and 21b by the distributor 29. The first position corresponds to the preponderance of the effect of the spring 33 over the ram 34.

Lastly, a torque meter 35 is arranged on the output shaft 28 of the engine 27 and at its connection 36 supplies information on the value of the output torque of the engine 27. The connection 36 is itself connected to the ram 34 by means of an operating connection 37, comprising a fluid conduit for example. The ram 34 is supplied with pressurized fluid as soon as the value of the torque detected by the torque meter 35 drops below a predetermined value.

The supply apparatus of FIG. 3 is similar to that of FIG. 2. It again includes the Diesel engine 27 whose output shaft 28 is coupled to the drive shafts 10, 16 and 25 of the pumps 4, 11 and 18 of the closed circuits 1 and 2 and the open circuit 3 respectively.

However, in this embodiment, the distributor 29 has been replaced by a conventional flow-limiter 38 of a controllable type. Additionally the shaft 39 of a centrifugal governor 40 is fast for rotation with a pinion 41 which meshes with the pinion 26. The centrifugal governor 40 may for example comprise the speed governor of the Diesel engine 27. The centrifugal governor 40 is connected by an operating connection 43 to the operating input 42 of the flow-limiter 38. As soon as an excessive speed of the engine 27 is detected by the centrifugal governor 40, this information is transmitted as an operating command by the connection 43 to the input 42 so as to cause the closure of the flow-limiter 38. By way of illustration, the connection 43 shown comprises an electric wire transmitting a current to excite an electromagnet 43c coupled to the means for controlling the flow-limiter 38. The mobile member 40a of the centrifugal governor 40 is arranged, for this purpose, facing a contact 43a connected to the wire 43 and will contact the contact 43a at excessive speeds. A current source 43b is arranged in the wire 43. In a modification, the connection comprises a fluid conduit supplying a ram for operating the adjustment member of the flow-limiter 38 with pressurized fluid, as is well known.

The supply apparatus of FIG. 4 includes only one closed circuit 1 of the two closed circuits of FIG. 3 and the open circuit 3. A pinion 44 is fast for rotation with the output shaft 28 of the Diesel engine 27 and meshes with the pinions 9 and 26. A three-position distributor 45 is coupled by a member 46 to the means 8 for controlling the delivery of the variable delivery pump 4. Three conduits 47, 48 and 49 are connected to the distributor 45 and respectively to the conduits 6 and 7 and the operating input 42 of the speed limiter 38 in the open circuit 3.

The three positions of the distributor 45 are as follows:

in the first position, corresponding to the position 8 of the means for controlling the delivery of the pump 4, the conduits 48 and 49 are placed in communication and conduit 47 is blocked at the distributor 45; the conduit 7 forms the intake conduit of the pump 4;

in the second or intermediate position, corresponding to the position 8a of the means for controlling the delivery of the pump 4, which position is the neutral position of this means which corresponds to zero delivery, the conduits 47, 48 and 49 are blocked at the distributor 45; and in the third position, corresponding to the position 8b of the means for controlling the delivery of the pump 4, the conduits 47 and 49 are placed in communication and the conduit 48 is blocked at the distributor 45; the conduit 6 forms the intake conduit of the pump 4.

It should be noted that an increase in the pressure in the conduit 49 causes the closure of the flow-limiter 38, this normally being held open by the action of its return spring 50.

The apparatus of FIG. 5 includes the components of FIG. 4, except for the replacement of the distributor 45 by a three-position distributor 45a and the replacement of the flow-limiter 38 by a limiter 38a.

The three positions of the distributor 45a are as follows:

in the first position, corresponding to the position 8 of the means for controlling the delivery of the pump 4, the conduits 47 and 49 are placed in communication and the conduit 48 is blocked at the distributor 45a; the conduit 6 forms the delivery conduit of the pump 4;

in the second or intermediate position, corresponding to the position 8a of the means for controlling the delivery of the pump 4 (neutral position of this means corresponding to zero delivery) and the conduits 47, 48 and 49 are blocked at the distributor 45a;

in the third position, corresponding to the position 8b of the means for controlling the delivery of the pump 4, the conduits 48 and 49 are placed in communication and the conduit 47 is blocked at the distributor 45a; the conduit 7 forms the delivery conduit of the pump 4.

It should be noted that a drop in the pressure in the conduit 49 causes the closure of the flow-limiter 38a, this is held open by the force of the pressure at the union 42 acting against the spring 50a which tends to hold the flow-limiter closed.

The apparatus of FIG. 6 also has the arrangement of the pumps 4 and 18 of FIG. 4. However, the motor 5a of the closed circuit 1 has two cylinder capacities having a union 51 connected to a cylinder capacity selection conduit 52. Moreover, the flow-limiter 53 arranged in the conduit 21 of the open circuit 3 is provided with a spring 54 for returning it to its open position, a first operating ram 55 which can be supplied with a fluid, the effect of whose pressure also tends to keep the limiter open, and a second operating ram 56 which can be supplied with a fluid, the effect of whose pressure tends to keep the flow-limiter 53 closed. An auxiliary pump 57 known as an operating pump is connected by its intake conduit 58 to the reservoir 20 and by its delivery conduit 59 to a two-position distributor 60. This distributor 60 is itself connected to the reservoir 20 by a conduit 61 and to the selection conduit 52.

In addition a non-return valve 62 is arranged in the conduit 52 and permits passage of the fluid from the distributor 60 towards the motor 5a. A by-pass conduit 63 is connected to the selection conduit 52 on either side of the non-return valve 62, a restriction 64 being arranged in this by-pass conduit 63. Lastly, a first operating conduit 65 connects the first ram 55 to the portion of the selection conduit 52 between the non-return valve 62 and the distributor 60, and a second operating conduit 66 connects the second operating ram 56 to the portion of the selection conduit 52 between the non-return valve 62 and the motor 5a.

The two positions of the distributor 60 are as follows:

in the first position the conduits 52 and 59 are placed in communication, the conduit 61 is blocked at the distributor 60 and the small cylinder capacity of the motor 5a is selected, in the second position the conduits 52, 59 and 61 are placed in communication and the large cylinder capacity of the motor 5a is selected.

A description of the operation of the supply apparatus which have been described will now be given to obtain a better understanding of the advantage which can be gained from their adoption.

Firstly, with the apparatus of FIG. 1, it will be noted that if the driver of the machine detects abnormal functioning of his machine, such as excessive speed of the machine or racing of the Diesel engine 27, he can reduce the section of the passage through the conduit 21 by moving the lever 24 of the flow-limiter 23. By so doing he impedes the delivery of the fluid by the pump 18 and consequently causes a reduction in the rotational velocity of the shaft 25 of the pump. The various elements coupled to this shaft 25, i.e. the output shaft 28 of the engine 27 and to the drive shafts 10 and 16 of the pumps 4 and 11, are also braked. As the deliveries of the pumps 4 and 11 are reduced, the motors 5 and 12 are also braked. In conclusion, the excess speed abnormality disappears. Naturally, throttling of the oil through the flow-limiter 23 causes a rise in the temperature of this oil which is cooled by passage through the cooler 22. It is advantageous to arrange the cooler 22, as shown, in the delivery conduit 21 after the flow-limiter 23 at the position where the temperature of the fluid is highest. Clearly, it is at this position that the efficiency of the cooler 22 is maximum.

It is sometimes advantageous to control the flow-limiter automatically. The embodiments of FIGS. 2 to 4 provide such automatic control.

In the embodiment of FIG. 2, a decrease in the torque transmitted by the shaft 28 of the engine 27 is detected by the torque meter 35. This decrease indicates that there is a risk of the engine 27 no longer driving the pumps 4, 11 and 18 but, on the contrary, being driven by these pumps. If the transmitted torque reaches a value lower than a predetermined value, there is a risk that the engine 27 will race and that the maximum safe speed of the machine will be exceeded. The information from the meter 35 is transmitted by the connection 37 to the ram 34, which places the distributor 29 in its second position. The normal delivery of the pump 18 is then blocked, which violently brakes the said pump and consequently also the engine 27. However, in order to avoid a sharp stop which could be damaging to the machine, as well as too high an excess pressure in the conduit part 21a, the conduit 31 provided with the pressure-limiting discharge-valve 32 is connected as a by-pass to the distributor 29.

The supply apparatus of FIG. 3 operates in a manner similar to that of FIG. 2, except that the information which effects closure, this time of the flow-limiter 38, is the detection of excessive speed by the centrifugal governor 40 and not the detection of a decrease in the torque transmitted by the shaft 28.

The information which causes the closure of the flow-limiter 38 of FIG. 4 is the detection of an increase in the pressure of the fluid in the intake conduit 6 or 7, depending on the operating circumstances, of the pump 4. In fact such a pressure increase reveals a tendency of the pump 4 to act as a motor and, consequently, reveals a risk of excessive speed of the hydraulic motor 5. Assume, for example, that the means for controlling the delivery of the pump 4 is at position 8 so that the pump delivers fluid into the conduit 6. As soon as, in this state, the pressure rises abnormally in the conduits 7 and 48, appropriate information is transmitted by the conduit 49 to the union 42 to cause the closure of the flow-limiter 38 and therefore a decrease in the rotational velocity of the shaft 25 of the pump 18 and the elimination of the above-mentioned risk of excessive speed. Clearly the same operation is obtained when the delivery control means is in its position 8b.

The apparatus of FIG. 5 is very similar to that of FIG. 4 except that the information used to control flow-limiter 38a is a drop in the pressure of the fluid contained in the delivery conduit 7 or 6, depending on the operating circumstances, of the pump 4. Such a pressure drop causes the closure of the flow-limiter, which causes a decrease in the rotational velocity of the shaft 25 of the pump 18 and elimination of the previously detected risk of excessive speed.

Lastly, in the embodiment of FIG. 6, the information causing closure of the flow-limiter 53 is the selection of the large cylinder capacity of the motor 5a. When the driver of the machine including the circuit 1 selects the large cylinder capacity of motor 5a, he desires to obtain a low rotational velocity of the motor 5a. Now, at the moment of changing the cylinder capacity, the motor will pass from its high to its low velocity. The flow-limiter 53 is employed to cause slowing of the shaft of the motor 5a during the change-over.

In operation, the large cylinder capacity of the motor 5a is selected, as mentioned above, by moving the distributor 60 into its second position. The ram 55 is suddenly placed in communication with the reservoir 20 by the conduits 65, 52 and 61. On the other hand the pressure only decreases progressively in the ram 56, for it is prevented from being placed in direct communication with the reservoir 20 through the conduits 66, 52, 63, 52 and 61 by the non-return valve 62 and impeded from so being by the restriction 64. Therefore the pressure is still momentarily maintained in the ram 56, while it is zero in the ram 55. This state of affairs causes the closure of the flow-limiter 53 and, consequently, the desired slowing.

In addition to the speed-limiting function which has been described, the pump 18 of the open circuit 3 of each of the embodiments of FIGS. 1 to 3 can supply an independent circuit, such as a ram for example. Additionally the motion of two closed circuits 1 and 2 may drive respectively the right and left tracks of a tracked public works machine, while the pump 18 of the open circuit 3 supplies the ram or rams of the working gear of the said machine. The application of such an arrangement to a tracked loader is particularly advantageous.

Thus, lastly, the closed circuits 1 and/or 2 are generally provided with injection and excess pressure limiting devices which are conventional but do not concern the construction and operation of the invention.

What is claimed is:

1. A pressurized fluid supply apparatus comprising:
    a closed circuit including a variable delivery pump having a drive shaft and no flow-limitation;
    an open circuit including a pump having a delivery conduit and a drive shaft, a fluid reservoir and a fluid cooler;
    an engine for driving said pumps and having an output shaft to which are coupled said drive shafts of said pumps, and
    a flow-limiter arranged in the delivery conduit of said pump of said open circuit so as to divide said delivery conduit into two portions and comprising a restriction whose configuration is independent of the pressure of the fluid in the portion of said delivery conduit immediately upstream of said flow-limiter.

2. Apparatus in accordance with claim 1, wherein said flow-limiter is provided with manually operable control means.

3. Apparatus in accordance with claim 1, wherein said flow-limiter is provided with automatically operable control means.

4. Apparatus in accordance with claim 3, wherein said flow-limiter comprises a two-position distributor, return means and an operating ram coupled to said distributor, the effects on said distributor of said return means and operating ram being opposed to each other, said return means urging said distributor into a first position in which the two portions of said delivery conduit are placed in communication and said ram urging said distributor into a second position in which said two portions of said delivery conduit are blocked at said distributor, and a torque meter arranged on said output shaft of said engine and coupled to said operating ram of said distributor for actuating said ram as soon as the value of the torque falls below a predetermined value.

5. Apparatus in accordance with claim 3, wherein a centrifugal governor is coupled to said output shaft of said engine and is connected to said flow-limiter to cause the closure of said flow-limiter as soon as an excessive speed of said engine is detected thereby.

6. Apparatus in accordance with claim 3, wherein a three-position distributor is connected to the two main conduits of said variable delivery pump of said closed circuit by two auxiliary conduits and to means for operating said flow-limiter by an operating conduit, and is coupled to means for controlling the delivery of said variable delivery pump, in an intermediate position of said distributor said two auxiliary conduits being blocked at said distributor and said delivery control means is in a neutral position and in the two extreme positions of said distributor said operating conduit is placed in communication with a respective one of said auxiliary conduits and said delivery control means is in a non-neutral position, such that closure of said flow-limiter is caused by an excess pressure of fluid in said auxiliary conduit which is in communication with said operating conduit in one of said extreme positions of said distributor and which is in communication with the intake conduit of said variable delivery pump.

7. Apparatus in accordance with claim 3, wherein a three-position distributor is connected to the two main conduits of said variable delivery pump of said closed circuit by two auxiliary conduits and to means for operating said flow-limiter by an operating conduit, and is coupled to means for controlling the delivery of said variable delivery pump, in an intermediate position of said distributor, said two auxiliary conduits being blocked at said distributor and said delivery control means is in a neutral position and in the two extreme positions of said distributor said operating conduit is placed in communication with a respective one of said auxiliary conduits and said delivery control means is in a non-neutral position such that closure of said flow-limiter is caused by a drop in the pressure of fluid in said auxiliary conduit which is in communication with said operating conduit in one of said extreme positions of said distributor and which is in communication with the delivery conduit of said variable delivery pump.

8. Apparatus in accordance with claim 3, wherein said closed circuit includes a motor which has two cylinder capacities and a cylinder capacity selection means which is connected to said motor by a selection conduit, a non-return valve arranged in said selection conduit to permit passage of fluid toward said motor, a by-pass conduit connected to said selection conduit on either side of said non-return valve and a restriction arranged in said by-pass conduit, and wherein said flow-limiter is provided with return means and a first operating ram operable to maintain said flow-limiter open and a second operating ram operable to close said flow-limiter, said first operating ram being connected by a first operating conduit to said selection conduit downstream of said non-return valve relative to said motor and said second operating ram being connected by a second operating conduit to said selection conduit upstream of said non-return valve relative to said motor.

* * * * *